United States Patent
Froedge

[15] 3,665,158
[45] May 23, 1972

[54] PLASTIC EXTRUSION DEVICE

[72] Inventor: Don T. Froedge, 407 Cleveland Ave., Glasgow, Ky. 42141

[22] Filed: July 31, 1970

[21] Appl. No.: 59,936

[52] U.S. Cl. ..............................219/421, 141/82, 219/426, 219/521
[51] Int. Cl. .................................................F27d 14/00
[58] Field of Search .....................219/420–427, 231, 219/303–304, 521; 126/284, 343.5; 120/116; 23/280; 141/82; 18/3.5

[56] References Cited

UNITED STATES PATENTS

| | | | |
|---|---|---|---|
| 1,962,007 | 6/1934 | Dow | 219/421 |
| 2,839,653 | 6/1958 | Kane | 219/521 X |
| 1,754,382 | 4/1930 | Baracate | 219/426 X |
| 2,405,103 | 7/1946 | Winn | 219/424 |
| 2,564,427 | 8/1951 | De Rugeris | 219/426 X |
| 1,381,500 | 6/1921 | Reader | 219/421 X |
| 1,815,589 | 7/1931 | Saachy | 219/421 X |
| 2,686,109 | 8/1954 | Moule | 219/420 X |
| 2,995,159 | 8/1961 | Berggren | 141/82 |
| 3,281,576 | 10/1966 | Cooper et al. | 219/421 |

FOREIGN PATENTS OR APPLICATIONS

| | | | |
|---|---|---|---|
| 223,519 | 9/1942 | Switzerland | 219/428 |

*Primary Examiner*—Volodymyr Y. Mayewsky
*Attorney*—Le Blanc & Shur

[57] ABSTRACT

The device, in the form of a hand gun, includes a chamber for receiving plastic material and a nozzle assembly disposed along the gun barrel. The nozzle assembly includes a conical element having an eccentric opening. This conical element is rotatable between positions misaligning and aligning the eccentric opening with a similar eccentrically disposed opening in the barrel in communication with the chamber. An access cover is provided for the chamber whereby it can be loaded with plastic material. Heating elements are disposed about the chamber and a trigger assembly is connected to a wire for rotating the conical nozzle element. In operation, the plastic material in the chamber is heated. When the nozzle element is rotated into a position aligning its opening with the barrel opening by actuation of the trigger, the pressure generated by heating the plastic material in the chamber displaces molten plastic material through the aligned nozzle and barrel openings.

13 Claims, 11 Drawing Figures

Patented May 23, 1972
3,665,158
2 Sheets-Sheet 1
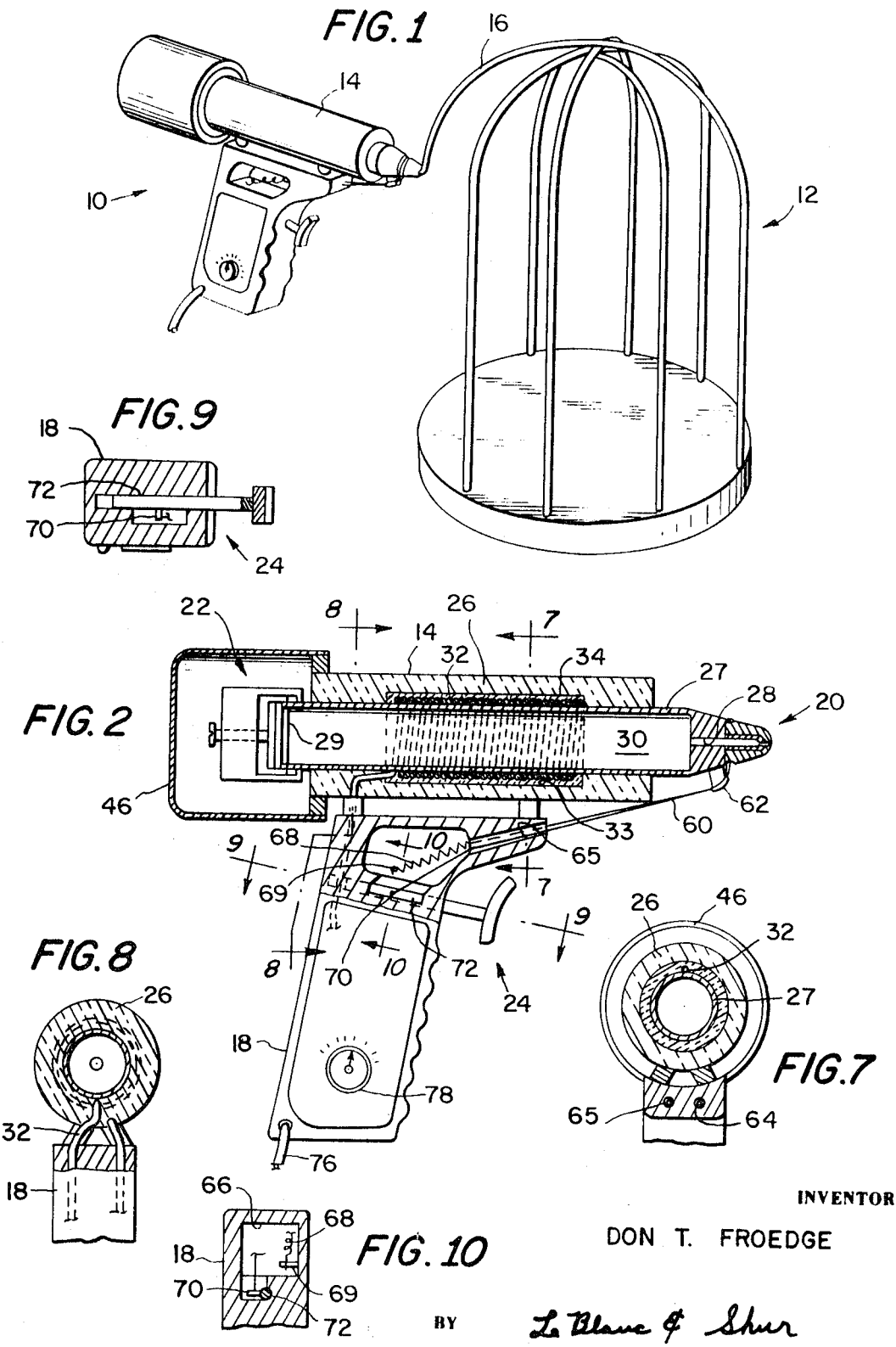
INVENTOR
DON T. FROEDGE
BY LeBlanc & Shur
ATTORNEYS

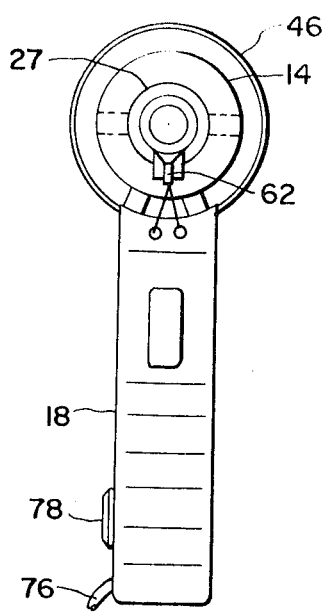
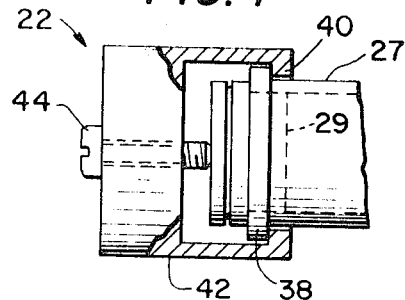
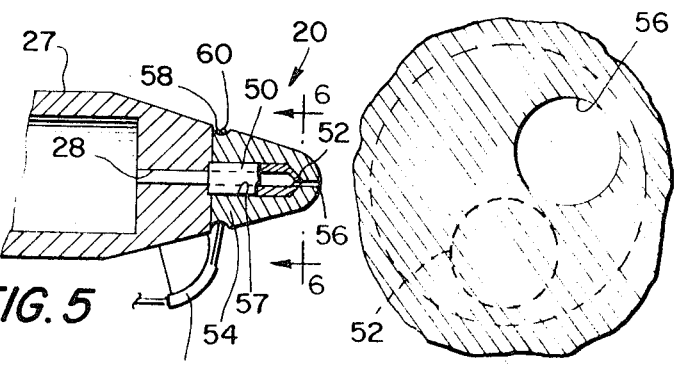
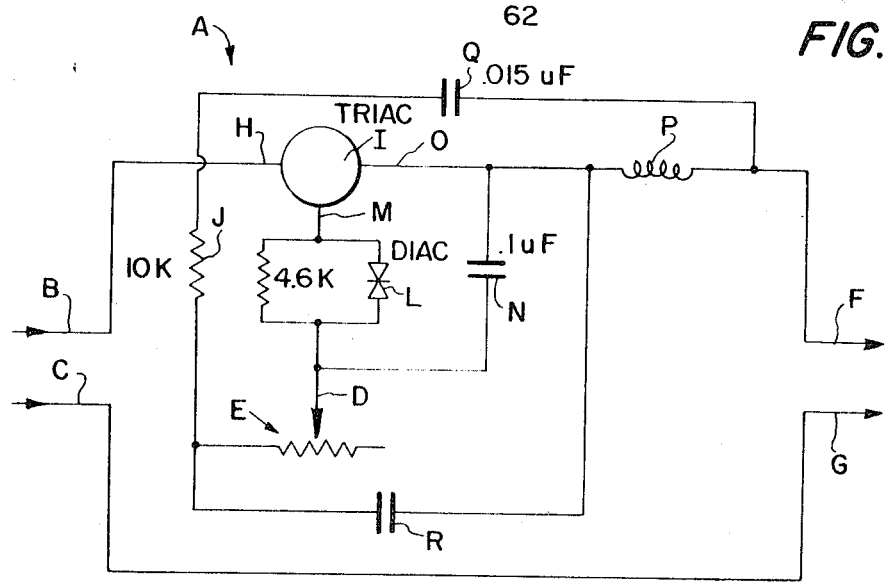
INVENTOR
DON T. FROEDGE

PLASTIC EXTRUSION DEVICE

The present invention relates to a plastic extrusion device and particularly relates to a plastic extruder in the form of a hand gun for forming hardened plastic strips or filaments specifically useful in the formation of two or three dimensional drawings, art forms, models, and the like.

Various types of hand held devices for extruding plastic material have been proposed and utilized in the past for a number of purposes. For example, in U.S. No. 2,995,159, there is disclosed a plastic injection device in the form of a hand gun wherein a strip of plastic material is passed through the barrel of the gun, heated and dispensed through a nozzle. That device is used for filling mold cavities, forming thermoplastic rivets and the like. As there disclosed, an air operated piston positively displaces the strip of plastic material through the barrel, a trigger assembly being provided to operate an air valve for advancing and retracting the piston. A check valve is also provided in the nozzle of the device. This provides a discontinuous impulsive extrusion. Similar devices also having positive displacement-type mechanisms for forcing the material from the tool are disclosed in U.S. Pat. Nos. 2,094,795, 2,437,263, and 3,281,576. In each of these, the material dispensed is positively displaced toward the outlet passage of the tool and the mechanism for accomplishing this is somewhat complex, cumbersome and expensive. Also, in certain of these devices the molten plastic material, even after release of the actuating trigger assembly tends to continue to extrude from the outlet passage, precluding accurate application of the plastic material to the work at hand.

The present invention provides a plastic extrusion device in the form of a hand gun which eliminates and/or minimizes the foregoing discussed problems associated with prior plastic applicators as discussed above and provides a novel, improved plastic extrusion device which is inexpensive to construct, simple to use, provides a smooth continuous plastic extrusion of any desired length, and particularly useful in forming two and three dimensional drawings, models, art forms and the like.

To this end, the present plastic extrusion device includes a housing in the form of a hand gun having a chamber in the barrel and a nozzle assembly on the barrel end. Heating elements are disposed above the chamber and the barrel is insulated by disposition of insulating material about the chamber. An access cover is provided on the opposite end of the barrel, the removal of which provides an opening into the chamber for loading it with the plastic material to be extruded. In the handle of the plastic extruder hereof, there is housed an electrical circuit which, when coupled to a source of electricity, is adapted to apply heat to the plastic material in the chamber for the purpose of melting the same and generating sufficient pressure within the chamber to force the molten plastic material through the nozzle. The circuit is configured such that the temperature of the heat applied to the plastic material can be selectively controlled. On the end of the gun barrel, there is provided a novel nozzle assembly including a conical element rotatable about an axis generally parallel to the longitudinal axis of the gun barrel and having a longitudinally extending passage therethrough offset from its axis of rotation. The conical element is mounted for rotation about a shaft having a like offset passage therethrough between positions aligning and misaligning the passages one with the other. In the aligned position, the pressure generated by the heat applied to the plastic material in the chamber displaces the molten plastic material from the chamber through the aligned passages for application to the work at hand. When the passage through the conical nozzle element is misaligned with the passage in the barrel housing, the element acts as a seal precluding further egress of the molten plastic from the chamber. A trigger assembly is provided for rotating the element between nozzle open and closed positions and includes a wire connected at one end to the trigger and extending about the nozzle element with its other end being fixed to the housing. The wire includes a spring portion. Actuation of the trigger displaces the wire against the bias of the spring to rotate the element into the nozzle open position which permits the extrusion of the molten plastic material from the chamber under pressure through the nozzle. Release of the trigger permits the spring to displace the wire in the opposite direction thereby rotating the nozzle element in the opposite direction to seal the chamber and preclude further egress of molten plastic from the chamber.

Accordingly, it is a primary object of the present invention to provide a novel, improved extrusion device for plastic materials.

It is another object of the present invention to provide a novel, improved plastic extrusion device having heating elements for melting plastic material whereby the pressure generated by the melted plastic displaces the molten plastic through a nozzle assembly.

It is still another object of the present invention to provide a plastic extrusion device in the form of a hand operated tool having a novel nozzle assembly for respectively opening and closing the outlet passage of the device.

It is a further object of the present invention to provide a plastic extrusion device which is uniquely applicable for forming two and three dimensional drawings, models, art forms and the like wherein the plastic device extrudes a thin continuous plastic filament which, upon separation from the nozzle, immediately hardens into a rigid, self-sustaining filament.

These and further objects and advantages of the present invention will become more apparent upon reference to the following specification, appended claims and drawings wherein:

FIG. 1 is a perspective view of a plastic extrusion device constructed in accordance with the present invention and illustrating use of the device in the formation of a three dimensional model;

FIG. 2 is a side elevational view of the plastic extrusion device hereof with parts broken out and in cross section for ease of illustration;

FIG. 3 is an end elevational view thereof;

FIG. 4 is an enlarged fragmentary view of an access assembly for the chamber containing the plastic material;

FIG. 5 is an enlarged cross-sectional view of a nozzle assembly employed on the end of the extrusion device hereof;

FIG. 6 is an enlarged fragmentary cross-sectional view of the nozzle assembly taken about on line 6—6 in FIG. 5;

FIGS. 7 – 10 are enlarged fragmentary cross-sectional views of the plastic extrusion device hereof taken generally about on lines 7—7, 8—8, 9—9 and 10—10 respectively in FIG. 2; and;

FIG. 11 is a schematic illustration of the electrical control circuit for the extrusion device hereof.

Referring now to the drawings, particularly to FIG. 1, there is illustrated a plastic extrusion device, generally indicated at 10, in the form of a hand gun which extrudes molten plastic material for forming rigid filaments or strips of harden plastic material. In the application of the device hereof illustrated in FIG. 1, the device 10 is employed to form a three dimensional model generally indicated 12. As will be appreciated from the ensuing description, plastic material can be extruded from device 10 to form various two and three dimensional art forms, models, drawings, and the like, the molten plastic issueing from the end of a barrel 14 and immediately hardening upon exposure to the cooler temperatures of the surrounding environment to form a rigid strip or filament such as filament 16 in model 12.

Referring now to FIG. 2, device 10 includes a handle 18 carrying barrel 14, the barrel 14 including a nozzle assembly generally indicated 20 and a barrel access assembly generally indicated 22 at the opposite end of barrel 14. Device 10 also includes a trigger assembly 24 for operating nozzle assembly 20 and thereby controlling the issuance of the molten plastic material from barrel 14. Particularly, barrel 14 includes an elongated outer sleeve 26, and an elongated tube 27, the tube 27 being suitably secured within barrel 14. Tube 27 has a reduced diameter passage 28 at its forward end and is closed at its opposite end by a closure cap 29 which forms a part of the access assembly 22 described hereinafter. It will be appreciated that tube 27 defines a chamber 30 into which plastic material is disposed for ejection in a molten condition through passage 28 and through nozzle assembly 20. A heater coil 32 disposed in a diametrically enlarged portion 33 of sleeve 26 surrounds a central portion of tube 27 within device 10, the coils of the heater 32 being embedded in a casing 34, preferably formed of a ceramic material. The tube 27 is preferably formed of a heat conducting material such as aluminum whereby the heat generated by the coil 32 is transmitted to the plastic material in chamber 30 for melting and providing sufficient pressure for ejecting the latter in a manner to be described hereinafter. The outer sleeve 26 is formed of a heat insulating material and surrounds the ceramic coated heater coil 32 and the major portion of tube 27 to permit safe handling of the device during operation.

Access assembly 22, as best illustrated in FIGS, 2 and 4, includes a plug 29 having a reduced diameter portion receivable within the rearmost portion of tube 27. A flange 38 is carried about the end of tube 27. Flange 38 has preferably a pair of diametrically opposed slots, not shown, through which may be passed inwardly projecting, similarly diametrically opposed lugs 40 carried on a clamp head 42. Head 42 is generally cylindrical and is recessed at one end as to receive plug 29 and an end portion of tube 27. The inner end of clamp head 42 can be passed over flange 38 when lugs 40 are aligned with the slots through flange 38 and rotated such that clamp head 42 cannot be removed from the end of tube 26. With the lugs 40 engaging behind flange 38, a screw 44 is threaded axially through clamp head 42 to engage the end face of plug 29 to retain the latter in sealing engagement about the inner end of tube 27. A cylindrical cap 46 (FIG. 2) may be provided and preferably makes a slip fit connection with the end of heat shield 26 fully enclosing tube access assembly 22. Thus, to obtain access to chamber 30, cover 46 is first slipped off heat shield 26 and screw 44 is unthreaded. The lugs 40 on head 42 are then aligned with the slots through retainer flange 38 and head 42 is removed from the end of tube 27. Plug 28 can then be removed from the end of tube 27 whereby additional plastic material can be disposed within chamber 30.

Referring now particularly to FIGS. 5 and 6, there is disclosed in detail the nozzle assembly 20. Particularly, there is disposed on the end of tube 27 a reduced diameter sleeve 50 in communication at one end with passage 28 and having an offset opening 52 at its opposite end. Rotatably mounted on sleeve 50 is a generally frustoconically shaped nozzle element 54 having a base 57 for receiving sleeve 50 and an opening 56 offset from the axis of rotation of element 54 similarly as opening 52 is offset from the central axis of sleeve 50. Element 54 is mounted for rotation about sleeve 50 and it will be appreciated, as particularly illustrated in FIG. 6, that element 54 is rotatable between positions aligning opening 56 with opening 52 thereby providing communication through the end of tube 27 from chamber 30 through passage 28, sleeve 50 and aligned openings 52 and 56 and a position wherein opening 56 is circumferentially offset from and misaligned with opening 52 precluding communication of molten plastic material from chamber 30 through the nozzle assembly 20. It will be appreciated that element 54 slips about sleeve 50 and is loosely mounted thereon for reasons to be described hereinafter.

To rotate element 54 between positions permitting discharge of molten plastic material from chamber 30 through nozzle assembly 20 and a position sealing the end of tube 27, the inner end of element 54 is provided with a circumferentially extending groove 58. A wire 60 is wrapped about groove 58 and one end thereof extends from element 54 through a suitable guide 62 carried on the lower side of tube 27 for connection with the handle 18 of device 10. Particularly, the wire passes through a slot 64 (FIG. 7) formed in handle 18 and extends within a cavity 66 (FIG. 10) where the wire is coiled to form a spring 68. The spring end is connected to a pin 69 (FIG. 10) fixed to handle 18 within cavity 66. The other end of the wire 60 extends through the guide 62 and through a second slot 65 for connection with an arm 70 projecting from the side of a shaft 72 forming a part of the trigger assembly 24. It will be appreciated that inward sliding movement of trigger assembly 24 displaces shaft 72 rearwardly thereby pulling wire 60 against the bias of spring 68 and also rotating nozzle element 54 from a position normally closing off chamber 30, i.e., from a position wherein openings 52 and 56 are misaligned one with the other. Release of trigger assembly 24 permits spring 68 to rotate nozzle element 54 in the opposite direction to return element 54 to a position normally preventing communication of molten plastic from chamber 30 through nozzle assembly 20.

FIG. 11 shows a heater circuit, generally indicated at A, for controlling the amount of current supplied to the heater coil 32 of FIG. 2. The input to the terminals B and C is by way of the power cord 76 of FIG. 2 from a conventional 60 Hz 110 volt electrical outlet. Knob 78 of FIG. 2 is connected to the wiper arm D of a rheostat or variable potentiometer E to control the amount of heating current supplied to the heating coil from output terminals F and G.

Connected between the first anode H of a bidirectional triode thyristor or triac I and the resistance element of rheostat E is a 10 kilohm resistor J. A 4.6 kilohm resistor K is connected in parallel with a bidirectional diode thyristor or diac L between the gate M of triac I and the wiper arm D of rheostat or potentiometer E. A 0.1 microfarad capacitor N connects the wiper arm to the second anode O of triac I. This anode is connected through a series inductance coil P to the active output terminal F. A 0.015 microfarad capacitor Q is connected across inductor P and triac I. An additional capacitor R is coupled between the resistor of rheostat E and the second anode of triac I. By manually adjusting the position of the wiper arm D of the potentiometer by way of rheostat knob 78 of FIG. 2, the effective impedance of triac I is varied to control the amount of alternating current appearing at output leads F and G, thereby controlling the temperature within tube 27.

In utilizing the plastic extrusion device hereof for forming models, drawings, two and three dimensional art forms and the like, cap 46 is removed from heat shield 26 and clamp head 42 is removed from the rearmost end of tube 27 in a manner previously described. Plug 29 is then withdrawn and plastic material in solid form, for example scrap plastic material, is disposed within chamber 30. Plug 29 is then inserted within tube 27 and clamp head 42 is secured to tube 27 as previously described to retain plug 29 within tube 27 effectively sealing chamber 30 and precluding blowout of plug 29 when high pressure is developed in chamber 30 as described hereinafter. Cap 46 is then applied to heat shield 26.

To melt the plastic material within chamber 30, the electrical circuit is connected with a suitable current source via power cord 76 and the knob 78 is rotated to adjust the position of the wiper arm D of the potentiometer whereby the desired temperature within tube 27 is obtained. Particularly, heat applied to the plastic material within chamber 30 by the heater coil 32 melts the plastic material and creates a pressure within chamber 30 sufficient to force the molten plastic material from chamber 30 through nozzle assembly 20 when the openings 52 and 56 are aligned one with the other as previously described. When the plastic in chamber 30 is in a molten condition, the device is ready for use and simply by pulling the trigger assembly 24, nozzle element 54 can be rotated such that opening 56 is aligned with opening 52 whereby the pressure within chamber 30 forces the molten plastic material through passage 28 and aligned openings 52 and 56. The molten plastic material extruded through the aligned passages and issuing from the end of the barrel hardens immediately upon contact with the cooler atmosphere surrounding the gun to form a strip or filament of plastic material, such as for example the filament illustrated at 16 in FIG. 1. By initially applying the molten filament to a fixed part, the device can be moved in space to form two and three dimensional art forms or moved over a surface to form a drawing or the like. When a particular filament of the drawing, art form or the like is completed, the trigger is released and spring 68 automatically returns nozzle element 54 to a position misaligning the openings 52 and 56 thereby precluding further discharge of molten plastic material from device 10. It will be appreciated that no positive displacement mechanism for discharging molten plastic material is required or necessary as the pressure created by heating the plastic material in chamber 30 is sufficient to discharge the molten plastic material from chamber 30 through the nozzle assembly 20.

It will be appreciated that the nozzle assembly 20 provides a control for varying the thickness or diameter of the strip or filament of plastic material formed by the device. For example, the nozzle element 54 can be partially rotated to partially align the openings 56 and 52 one with the other to a greater or lesser extent as desired whereby the quantity of molten plastic material discharged from the device and hence the thickness of the filament formed thereby can be regulated and controlled. Also, the particular nozzle assembly 20 acts as a safety valve in that nozzle element 54 will side axially in a forward direction relative to sleeve 50 in response to pressure in chamber 30 beyond a predetermined pressure. The nozzle element 54, in moving axially forwardly, will open the valve permitting discharge of the molten plastic material from chamber 30 and thereby relieving the pressure in chamber 30. When the pressure decreases, the control wire 60 under the bias of spring 68 moves the nozzle element 54 axially in a rearward direction returning it to its normal operating position as shown in FIG. 5.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A plastic extrusion device comprising a housing having a chamber for containing a plastic material, a value carried by said housing and having a passage in communication with said chamber for extruding molten plastic material therefrom, said value including an element movable between a first position preventing flow of molten plastic material from said chamber through said passage and a second position permitting flow of molten plastic material from said chamber through said passage, heating means carried by said housing for heating and melting the plastic material in said chamber to generate pressure sufficient to displace the molten plastic material from said chamber through said passage when said valve element lies in said second position, said chamber being otherwise substantially hermetically sealed when the plastic material is heated and flowed through said passage, the pressure developed in the chamber by heating and melting the plastic material constitutes the sole means for displacing the molten plastic material from the chamber, and means carried by said housing for moving said valve element between said first and second positions 2. The device according to claim 1 wherein said housing includes a passage in communication with said chamber, said valve element being carried by said housing for rotation between said first and second positions and including a passage through said valve element, said moving means being operable to rotate said valve element from said first position wherein said passages are misaligned one with the other with said valve element sealing said housing passage to a second position wherein said passages lie in communication one with the other permitted flow of molten plastic material from said chamber through said valve.

3. The device according to claim 2 wherein said housing is in the general shape of a hand gun with said chamber and valve forming a part of the gun barrel, said moving means including a movable trigger, and means connecting between said trigger and said valve element to rotate said valve element between said first and second positions in response to movement of said trigger from a predetermined position.

4. The device according to claim 3 including means for automatically returning said valve element to said first position from said second position in response to release of said trigger.

5. The device according to claim 4 wherein said returning means includes a spring for biasing said valve element into said first position.

6. A device according to claim 3 wherein said valve element is carried by said housing for rotation about an axis generally parallel to longitudinal axis of said barrel, said passage in said valve element lying offset from its axis of rotation.

7. The device according to claim 3 including heat insulating material carried by said barrel about said chamber, and removable closure means for providing access to said chamber for supplying the latter with the plastic material.

8. The device according to claim 3 including means for selectively controlling the temperature of the plastic material in the chamber.

9. The device according to claim 1 in combination with the plastic material.

10. The device according to claim 1 wherein said housing is in the general shape of a hand gun with said chamber and valve forming a part of the gun barrel, said moving means including a movable trigger, means connecting between said trigger and said valve element to move said valve element between said first and second positions in response to movement of said trigger from a predetermined position, and means for automatically returning said valve element to said first position from said second position in response to release of said trigger.

11. The device according to claim 10 wherein said heating means includes an electrical circuit, said circuit comprising a heater coil carried by said housing about said chamber, and means forming a part of said electrical circuit for selectively controlling the temperature and pressure of the plastic material in said chamber.

12. A plastic extrusion device comprising a housing having a chamber for containing a plastic material and an outlet passage in communication with said chamber for extruding the plastic material therefrom, a valve carried by said housing including an opening for access to said chamber to load it with a plastic material, a closure member carried by said housing and sealingly engageable therewith about said opening, heating means carried by said housing for heating and melting the plastic material in said chamber to generate pressure sufficient to displace the molten plastic material from said chamber through said outlet passage when said passage is open, said chamber being substantially hermetically sealed when the plastic material is heated and flowed through said outlet passage, the pressure developed in the chamber by heating and melting the plastic material constitutes the sole means for displacing the molten plastic material from said chamber.

13. A plastic extrusion device according to claim 12 including means for selectively controlling the temperature and pressure of the plastic material in said chamber.

* * * * *

UNITED STATES PATENT OFFICE
CERTIFICATE OF CORRECTION

Patent No. 3,665,158      Dated May 23, 1972

Inventor(s) Don T. Froedge

It is certified that error appears in the above-identified patent and that said Letters Patent are hereby corrected as shown below:

In Column 1, line 9, "U.S. No. 2,995,159" should read --U.S. Patent No. 2,995,159--.
    In Column 2, line 51, "harden" should read --hardened--.
    In Column 5, line 17, "side" should read --slide--; lines 38 and 41, "value" should read --valve--.
    In Column 6, line 2, Claim 2, "permitted" should read --permitting--; line 49, Claim 12, after "housing", --for selectively opening and closing said passage, said housing-- should be inserted.

Signed and sealed this 21st day of November 1972.

(SEAL)
Attest:

EDWARD M. FLETCHER, JR.          ROBERT GOTTSCHALK
Attesting Officer               Commissioner of Patents